US011145102B2

(12) United States Patent
Tan et al.

(10) Patent No.: US 11,145,102 B2
(45) Date of Patent: Oct. 12, 2021

(54) USING A HANDHELD DEVICE TO RECREATE A HUMAN POSE OR ALIGN AN OBJECT IN AN AUGMENTED REALITY OR VIRTUAL REALITY ENVIRONMENT

(71) Applicant: Volvo Car Corporation, Gothenburg (SE)

(72) Inventors: Qinzi Tan, San Jose, CA (US); Lukasz Pasek, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 3 days.

(21) Appl. No.: 16/672,554

(22) Filed: Nov. 4, 2019

(65) Prior Publication Data

US 2021/0134039 A1 May 6, 2021

(51) Int. Cl.
*G06T 13/40* (2011.01)
*G06T 19/00* (2011.01)
*G06F 3/0481* (2013.01)
*G06F 3/0346* (2013.01)
*G02B 27/01* (2006.01)
*G06T 19/20* (2011.01)

(52) U.S. Cl.
CPC ............ *G06T 13/40* (2013.01); *G02B 27/017* (2013.01); *G06F 3/0346* (2013.01); *G06F 3/04815* (2013.01); *G06T 19/006* (2013.01); *G06T 19/20* (2013.01)

(58) Field of Classification Search
CPC ............ A63B 2220/836; A61B 5/1116; G02B 2027/0178; G02B 27/0149; G06F 3/011; G06F 3/017; G06F 3/0484; G06F 3/04845; G06T 19/006
See application file for complete search history.

(56) References Cited

U.S. PATENT DOCUMENTS

| 6,005,548 A | 12/1999 | Latypov et al. |
|---|---|---|
| 6,050,962 A | 4/2000 | Kramer et al. |
| 8,638,985 B2 | 1/2014 | Shotton et al. |
| 2009/0322763 A1* | 12/2009 | Bang ................... G06K 9/00342 345/474 |
| 2016/0232715 A1 | 8/2016 | Lee |
| 2017/0136296 A1* | 5/2017 | Barrera ................ A61B 5/6898 |
| 2017/0354843 A1* | 12/2017 | Vuillerme ................ G09B 5/04 |
| 2018/0095636 A1 | 4/2018 | Valdivia et al. |

* cited by examiner

*Primary Examiner* — Yuzhen Shen
(74) *Attorney, Agent, or Firm* — Clements Bernard Walker; Christopher L. Bernard

(57) ABSTRACT

A method of and system for recreating a real world pose or aligning a real world object in a virtual space, the method including: prompting a user to successively place a device at a plurality of positions/alignments associated with a plurality of physical points associated with a body of the user, a body of another, or an object; capturing the plurality of positions/alignments with respect to a real world frame of reference; translating the plurality of positions/alignments with respect to the real world frame of reference to a frame of reference in virtual space; and recreating a pose of the body of the user, a pose of the body of the other, or an alignment of the object in the virtual space using the translated plurality of positions/alignments.

20 Claims, 8 Drawing Sheets

USING A HANDHELD DEVICE TO RECREATE A HUMAN POSE OR ALIGN AN OBJECT IN AN AUGMENTED REALITY OR VIRTUAL REALITY ENVIRONMENT

TECHNICAL FIELD

The present disclosure relates generally to augmented reality (AR) and virtual reality (VR) methods and systems. More particularly, the present disclosure relates to methods and systems that utilize a handheld device to recreate a human pose or align an object in an AR or VR environment. These methods and systems may be applied in automotive and other contexts.

BACKGROUND

Placing a person or avatar within a virtual space and presenting, aligning, and retaining their pose in this virtual space when spawning, for example, is problematic. Other similar object placement, alignment, and spawning tasks are likewise problematic. Enabling a determination of the current relative positions of attributes of the person or object and the alignment of these attributes in the context of a presented object or objects enables one to trust a personalized virtual representation. At present, when immersive experience creators want to align a human pose in physical reality with an avatar in the virtual world, for example, there are two possible solutions. First, external cameras can be used to capture the human pose in physical reality, identifying a multitude of points associated with the human pose and translate the human pose to the virtual world. Second, external motion sensors can be used to capture the human pose in physical reality, again capturing a multitude of points associated with the human pose, and translate the human pose to the virtual world. Both of these approaches require complex and expensive external equipment, i.e., cameras or motion sensors.

In a broader context, motion capture transfers the movement of a person or object to an avatar or representation. Optical systems use one or more cameras (with or without datum markers) to identify, locate, and track one or more datum points associated with the person or object, while non-optical systems measure the mechanical motion or inertia of the one or more datum points, both in two dimensions (2D) or three dimensions (3D). Marker-less systems use software to locate and track distinctive features identified using an artificial intelligence (AI) algorithm or the like. Generally, a virtual "skeleton" of the person or object is created and utilized, however this construct is only as good as the initial pose and alignment information gathered, which again may require complex and expensive external equipment. More robust AI algorithms provide more robust representations. For example, with regard to a human pose, more robust AI algorithms are better able to approximate and track relative body dimensions and the like, which are typically monitored using a host of cameras and/or motion sensors, including infrared (IR) cameras for depth perception, etc.

Thus, what is absent from the art is a simplified method for placing a person or object within a virtual space and presenting, aligning, and retaining their/its pose/alignment in this virtual space when spawning, for example, preferably utilizing readily available equipment, such as an AR-enabled phone, six degree-of-freedom (6DoF) controller, or the like.

SUMMARY

The present disclosure utilizes existing AR/VR technologies and 3D development platforms to track transform data aligned with a real world coordinate system from an AR-enabled phone, 6DoF controller, or the like in relation to an established virtual coordinate system, thereby creating a human pose, object alignment, or like capturing tool. A user is asked to place the given device at various body joints or object part locations. The application provided then transforms this collected spatial data to reconstruct the shape of the body or alignment of the object, providing current pose or placement in the virtual world, especially at spawning. It is also contemplated to capture spatial data associated with physical objects attached to or contacting a body to improve spawning results. From there, a personalized immersive environment and experiences can be provided with proper spatial orientation relative to the person or object.

In one exemplary embodiment, the present disclosure provides a method of recreating a real world pose or aligning a real world object in a virtual space, the method including: prompting a user to successively place a device at a plurality of positions associated with a plurality of physical points associated with a body of the user, a body of another, or an object; capturing the plurality of positions with respect to a real world frame of reference; translating the plurality of positions with respect to the real world frame of reference to a frame of reference in virtual space; and recreating a pose of the body of the user, a pose of the body of the other, or an alignment of the object in the virtual space using the translated plurality of positions. Optionally, the method further includes prompting the user to successively place the device at the plurality of positions associated with the plurality of physical points associated with the body of the user, the body of the other, or the object in one or more alignments; capturing the plurality of positions and the one or more alignments with respect to the real world frame of reference; translating the plurality of positions and the one or more alignments with respect to the real world frame of reference to the frame of reference in virtual space; and recreating the pose of the body of the user, the pose of the body of the other, or the alignment of the object in the virtual space using the translated plurality of positions and the one or more alignments. The device includes one of a smartphone with a camera and a 6 degree-of-freedom controller. The prompting is performed by one of a mobile application executed on the smartphone and an application executed on a virtual headset. The capturing, translating, and recreating are performed by one or more of a mobile application executed on the smartphone, an application executed on a virtual headset, and a processor coupled to the device. Optionally, prompting the user to successively place the device at the plurality of positions associated with the plurality of physical points associated with the body of the user, the body of another, or the object includes prompting the user to place the device proximate one or more objects associated with the plurality of physical points associated with the body of the user, the body of another, or the object. Optionally, capturing the plurality of positions with respect to the real world frame of reference includes taking a plurality of position measurements over a predetermined period of time and filtering the plurality of position measurements to obtain a final position measurement. Optionally, capturing the plurality of positions with respect to the real world frame of reference includes taking a plurality of position measurements over a predetermined period of time and averaging the plurality of position measurements to obtain a final position measurement. The method further includes using the recreated pose of the body of the user, the recreated pose of the body of the other, or the recreated alignment of the object in the virtual space to instantiate other objects about the recreated pose of the body of the user, the recreated pose of the body of the other, or the recreated alignment of the object in the virtual space.

In another exemplary embodiment, the present disclosure provides a non-transitory computer-readable medium stored in a memory and executed by a processor to recreate a real world pose or align a real world object in a virtual space, the non-transitory computer-readable medium executing the steps including: prompting a user to successively place a device at a plurality of positions associated with a plurality of physical points associated with a body of the user, a body of another, or an object; capturing the plurality of positions with respect to a real world frame of reference; translating the plurality of positions with respect to the real world frame of reference to a frame of reference in virtual space; and recreating a pose of the body of the user, a pose of the body of the other, or an alignment of the object in the virtual space using the translated plurality of positions. Optionally, the steps further include prompting the user to successively place the device at the plurality of positions associated with the plurality of physical points associated with the body of the user, the body of the other, or the object in one or more alignments; capturing the plurality of positions and the one or more alignments with respect to the real world frame of reference; translating the plurality of positions and the one or more alignments with respect to the real world frame of reference to the frame of reference in virtual space; and recreating the pose of the body of the user, the pose of the body of the other, or the alignment of the object in the virtual space using the translated plurality of positions and the one or more alignments. The device includes one of a smartphone with a camera and a 6 degree-of-freedom controller. The prompting is performed by one of a mobile application executed on the smartphone and an application executed on a virtual headset. The capturing, translating, and recreating are performed by one or more of a mobile application executed on the smartphone, an application executed on a virtual headset, and a processor coupled to the device. Optionally, prompting the user to successively place the device at the plurality of positions associated with the plurality of physical points associated with the body of the user, the body of another, or the object includes prompting the user to place the device proximate one or more objects associated with the plurality of physical points associated with the body of the user, the body of another, or the object. Optionally, capturing the plurality of positions with respect to the real world frame of reference includes taking a plurality of position measurements over a predetermined period of time and filtering the plurality of position measurements to obtain a final position measurement. Optionally, capturing the plurality of positions with respect to the real world frame of reference includes taking a plurality of position measurements over a predetermined period of time and averaging the plurality of position measurements to obtain a final position measurement. Optionally, the steps further include using the recreated pose of the body of the user, the recreated pose of the body of the other, or the recreated alignment of the object in the virtual space to instantiate other objects about the recreated pose of the body of the user, the recreated pose of the body of the other, or the recreated alignment of the object in the virtual space.

In a further exemplary embodiment, the present disclosure provides a system for recreating a real world pose or aligning a real world object in a virtual space, the system including: a device executing an application operable for prompting a user to successively place the device or a coupled device at a plurality of positions associated with a plurality of physical points associated with a body of the user, a body of another, or an object; wherein the application is further operable for capturing the plurality of positions with respect to a real world frame of reference; wherein the application is further operable for translating the plurality of positions with respect to the real world frame of reference to a frame of reference in virtual space; and wherein the application is further operable for recreating a pose of the body of the user, a pose of the body of the other, or an alignment of the object in the virtual space using the translated plurality of positions. Optionally, the application is further operable for: prompting the user to successively place the device or the coupled device at the plurality of positions associated with the plurality of physical points associated with the body of the user, the body of the other, or the object in one or more alignments; capturing the plurality of positions and the one or more alignments with respect to the real world frame of reference; translating the plurality of positions and the one or more alignments with respect to the real world frame of reference to the frame of reference in virtual space; and recreating the pose of the body of the user, the pose of the body of the other, or the alignment of the object in the virtual space using the translated plurality of positions and the one or more alignments.

BRIEF DESCRIPTION OF THE DRAWINGS

The present disclosure is illustrated and described with reference to the various drawings in which like reference numbers are used to denote like system components/method steps, as appropriate, and in which.

DESCRIPTION OF EMBODIMENTS

Figure 1:
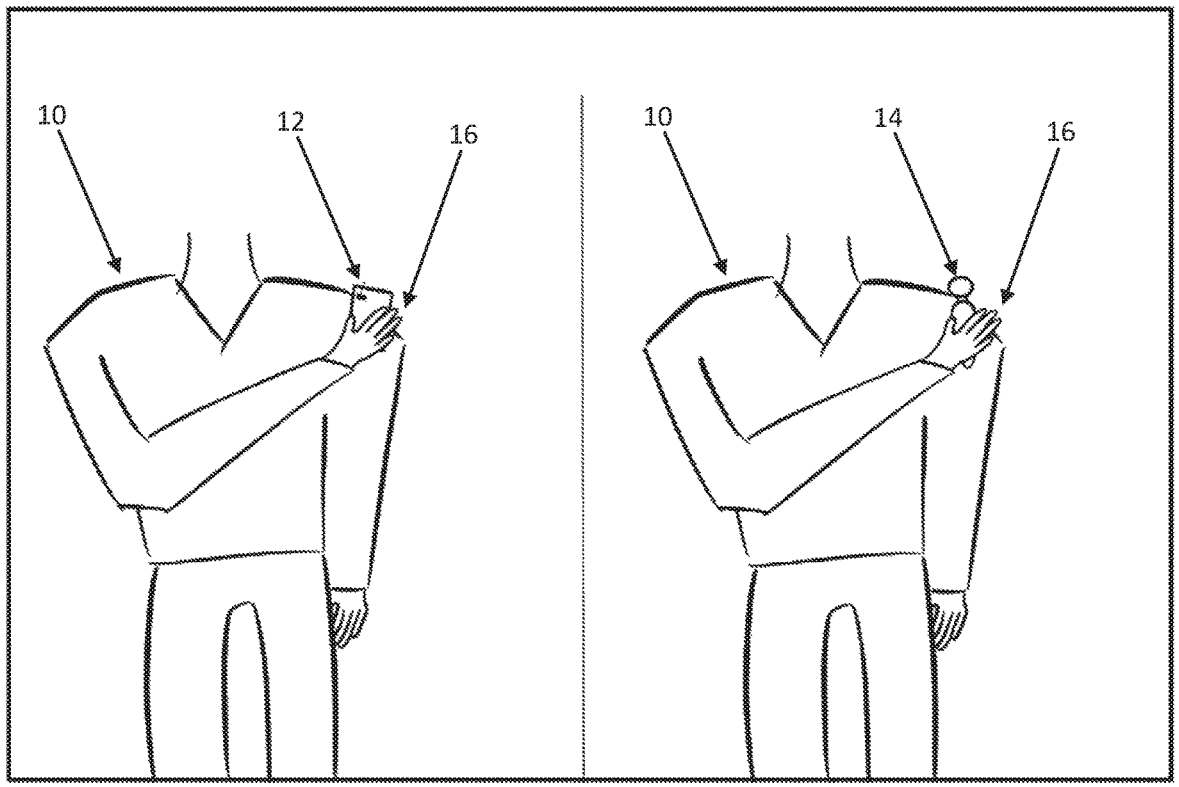
FIG. 1 is a schematic diagram illustrating the operation of one exemplary embodiment of the AR/VR app of the present disclosure, highlighting the use of a smartphone and a 6DoF controller.

The present disclosure utilizes existing AR/VR technologies and 3D development platforms to track transform data aligned with a real world coordinate system from an AR-enabled phone, 6DoF controller, or the like in relation to an established virtual coordinate system, thereby creating a human pose, object alignment, or like capturing tool. A user is asked to place the given device at various body joints or object part locations. The application provided then transforms this collected spatial data to reconstruct the shape of the body or alignment of the object, providing current pose or placement in the virtual world, especially at spawning. It is also contemplated to capture spatial data associated with physical objects attached to or contacting a body to improve spawning results. From there, a personalized immersive environment and experiences can be provided with proper spatial orientation relative to the person or object.

The AR/VR technologies that are used to track transform data from the AR-enabled phone, 6DoF controller, or the like in relation to an established virtual coordinate system include those that use a smartphone's camera, for example, to add interactive elements to an image or video of a real world environment, which can be viewed through the hardware layer. Such tools are well known to persons of ordinary skill in the art and typically require no special hardware to operate. They include, for example, ARCore™ by Google LLC, ARKit™ by Apple Inc., and ARFoundation. These tools generally allow a developer to add things like advanced spatial understanding and motion tracking to an application (app), allowing a device to better understand its relationship to an environment. The device is enabled to judge the position of an object in the environment, etc., and track its relative position as it moves, allowing for a deeper understanding of the real world. Horizontal and vertical planes can be detected and utilized, as well as reference feature points and light estimation. Similarly, well known 6DoF controller packages and immersive headset technologies with 6DoF control may also be utilized (available from a variety of manufacturers), sensing and utilizing motion and control in forward-backward, side-to-side, and up-down directions and about roll, pitch, and yaw axes.

The 3D platforms that are used to track transform data from the AR-enabled phone, 6DoF controller, or the like in relation to an established virtual coordinate system include various game development engines and the like, such as Unity3D™ by Unity IPR APS and Unreal™ by Epic Games, Inc. that allow 3D environments to be generated and interacted with. In general, game development engines function as central stations that connect physical devices, application programming interfaces/software development kits (APIs/SDKs), customized coordinate calculation and alignment logics, user interfaces (UIs), and other assets together, and allow a project to be assembled into a compliant package.

Referring now specifically to FIG. 1, in one exemplary embodiment, the app-directed process of the present disclosure includes directing a user 10 holding an AR-enabled smartphone 12 or 6DoF controller 14 to place the camera of the AR-enabled smartphone 12 or the 6DoF controller 14 as close as possible to a point of interest, such as a joint 16 of the user 10 or a specific point on an object and trigger a detection process by the camera of the smartphone 12 or the controller 14. Optionally, when a camera is used, a directed, constrained alignment may also be selected. Through the tools mentioned above, the smartphone 12 or controller 14 is able to align this real world datum point in a virtual environment and spawn a virtual 2D or 3D model at or in relation to this common point, thereby creating a more accurate immersive virtual experience, without the need for additional tools. Multiple datum points can be identified as relatively positioned in this same manner. Thus, multiple datum points, with known locations and relationships in real space, can be relatively translated to virtual space, maintaining relativistic consistency.

It will be appreciated that, as used herein, "smartphone" broadly encompasses other handheld smart devices as well, such as tablets and the like, provided that they are AR-enabled. In the exemplary embodiment illustrated, the smartphone 12 or controller 14 is used to spawn a virtual 3D model on or at the shoulder 16 of the user 10, which acts as an ongoing frame of reference. The head, elbow, hand, waist, knee, and foot of the user 10 can be similarly located and utilized, such that a real skeleton can be mapped and a virtual "skeleton" built and spawned.

The app interface of the present disclosure is based on the AR/VR technologies provided above, and similar AR/VR technologies in existence and that may be developed. The app enables, through the selection of one or more datum points in the manner provided, a virtual coordinate system to be correlated to a physical space, such that the app can subsequently track and correlate both translational and rotational information received from the smartphone and/or 6DoF controller. An AR camera or controller GameObject is utilized by the app to track both translational and rotational information of the smartphone or 6DoF controller in space, such that user pose data or the like can be provided to the app via the GameObject. In this sense, the smartphone or 6DoF controller acts as a "smart" internal marker that can be visualized and utilized without the use of an expensive external camera or motion sensor, especially during an avatar or object spawning operation.

For smartphones, when the app is run on the supported device, a virtual coordinate system is created and correlated to the physical space automatically with the initial requested pose of the device's camera considered to be the origin.

For 6DoF controllers or immersive headsets with 6DoF control, tracking functionalities are typically provided out of the box. It will be appreciated by persons of ordinary skill in the art that, as used herein, "6DoF controller" is intended to be used generically for any "multi-degree-of-freedom" mDoF controller, which may provide 6 or fewer degrees of freedom. For example, the use of an x-y-z controller is also contemplated, for example.

Text or audio instructions are provided by the app to guide the user through the placement and capture process. Once the user interacts with the app interface (digital button on a 2D screen, physical button on a controller, or the like) to indicate that the camera or controller is stabilized at an attribute, joint, or object of interest, data collection beings to capture a real time set of position/alignment/pose data in relation to the virtual coordinate system for a short period of time, for example. A filtering algorithm is then applied to the raw data in order to minimize error, if any, and an average result is calculated. This process is repeated for all desired attributes associated with a given pose or object. For example, for the capture of a sitting pose, the joint dataset may include the position of a user's knees, chest, seat height, and facing direction. Based on this capture result, a corresponding human avatar can be spawned and/or virtual objects can be placed in relation to the human pose (e.g., a virtual car seat can be placed underneath the user, a steering wheel and dashboard may be placed in front of the user, etc. and then manipulated).

Figure 2:
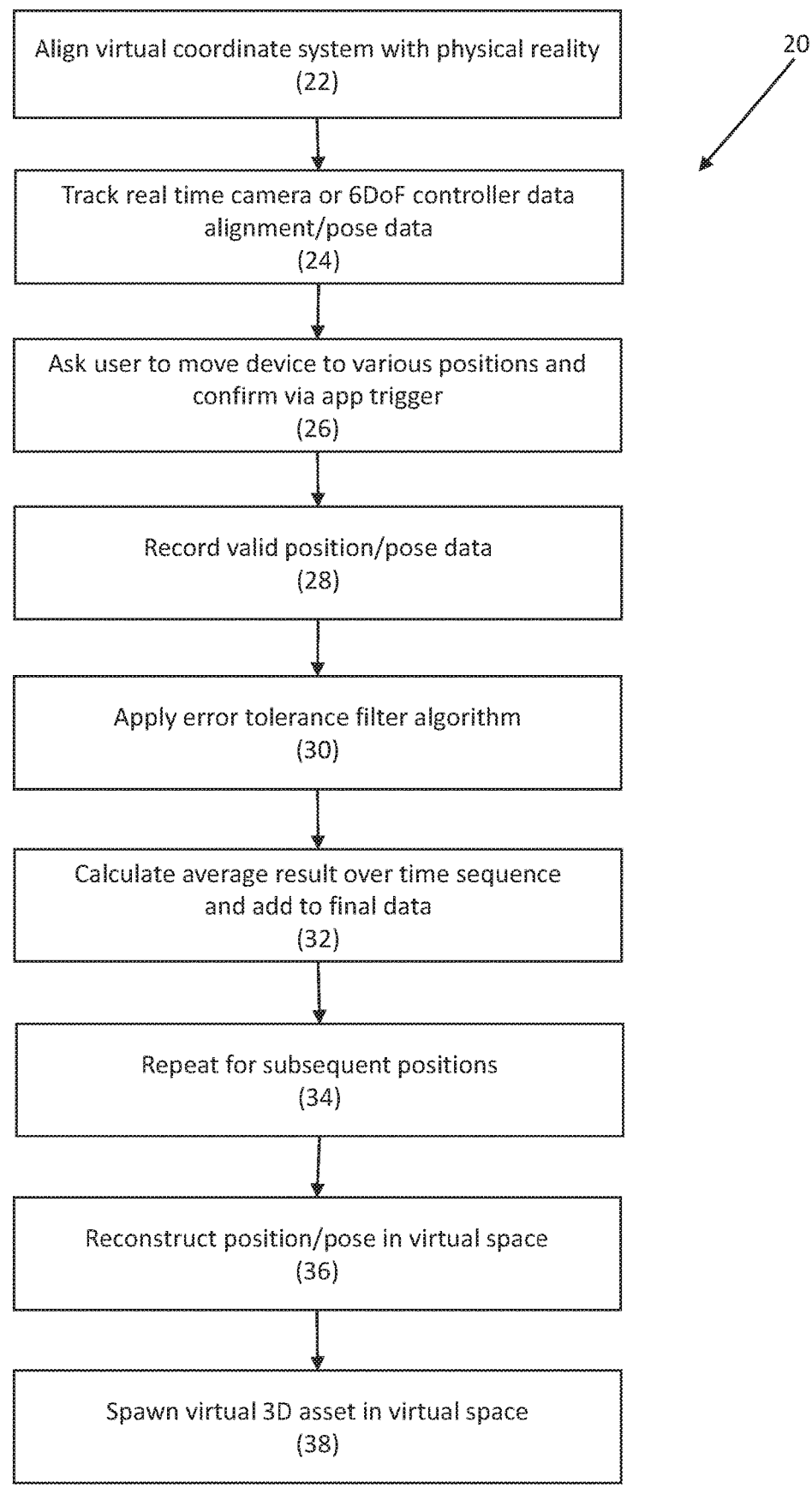
FIG. 2 is a flowchart illustrating the operation of one exemplary embodiment of the AR/VR method of the present disclosure.

Referring now specifically to FIG. 2, in another exemplary embodiment, the AR/VR method 20 of the present disclosure includes first aligning a virtual coordinate system with a real world coordinate system 22 and second tracking real time smartphone or 6DoF user pose (or object position and alignment) data 24. These functionalities are inherently carried out using the tools mentioned above when executed on the smartphone and/or 6DoF controller. The app asks the user to move the device utilized to various target positions or datum points, such as joints of a body or pose or the like, and confirm such placement via an app triggering mechanism, such as a swipe, button press, or voice command 26. Positioning can be corrected and re-triggered until accurate. Valid pose or position and alignment data is then collected 28 by the app. Subsequently, an error tolerance filtering algorithm is then applied 30. This error tolerance filtering algorithm may consist of a basic thresholding operation, for example. Next, an average result over time or successive iterations may be calculated and stored as part of the final data result 32, when a time window is allowed for successive capture events, for example. This process is repeated for successive positions of interest, such as successive joints of the user, for example 34. From the collected datum points, the user pose, object alignment, or the like may then be reconstructed in virtual space, using the virtual coordinate system that has a known relation to the real world coordinate system 36. Finally, a 3D asset can be spawned in virtual space, such as the user with the determined pose or the object with the determined alignment 38, or a whole virtual environment can be spawned based on the user's pose, position in space (whole body or specific joint), and/or orientation. Such pose reconstruction, when specified, is an important application of the app and method of the present disclosure, but should not be viewed as strictly limiting. Object alignment is equally important.

Figure 3:
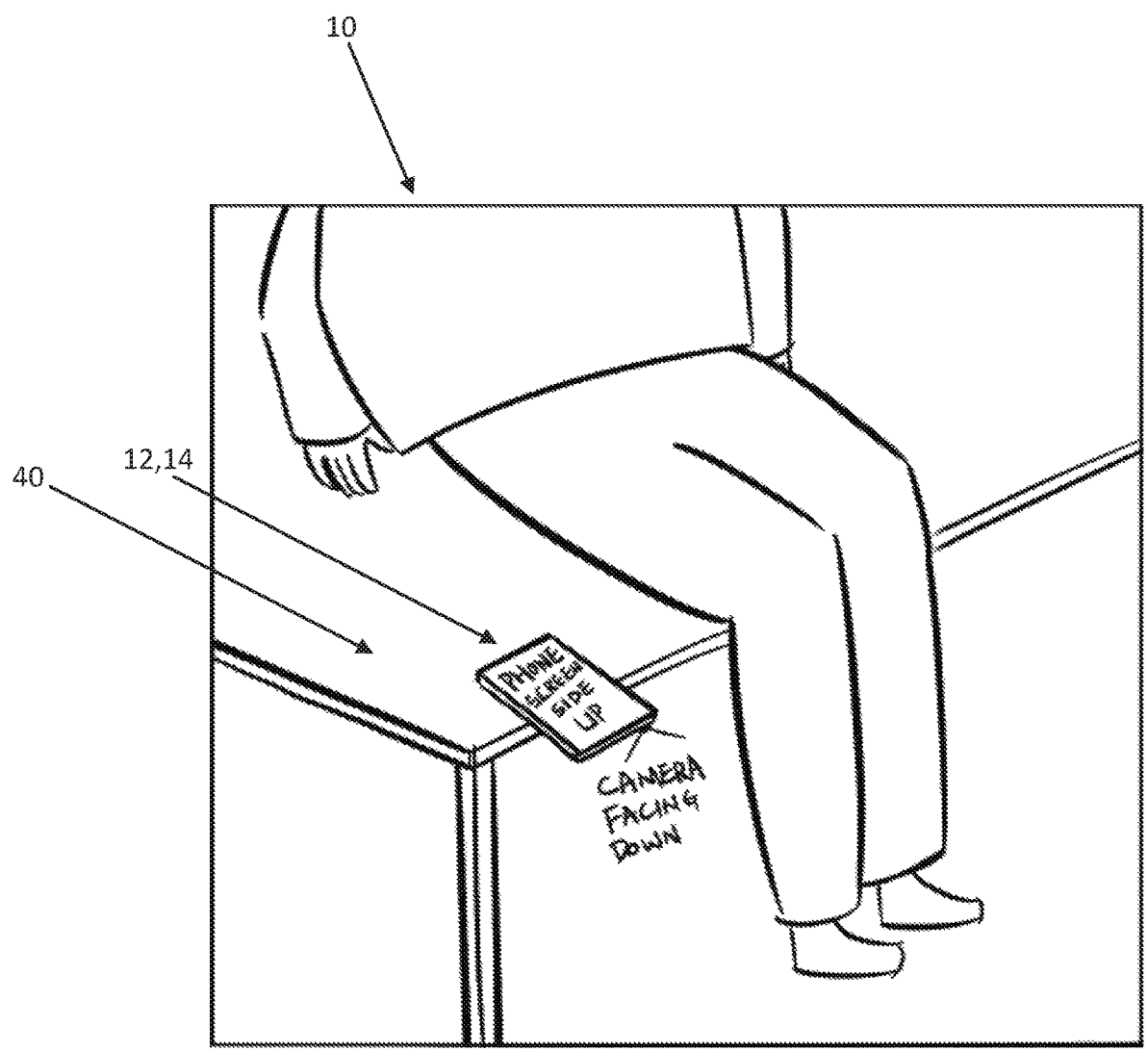
FIG. 3 is a schematic diagram illustrating the operation of one exemplary step of the AR/VR app of the present disclosure, highlighting the use of a smartphone or a 6DoF controller to orient a seated real world user in virtual space.

Example 1: Aligning a Seated Real World User or Spawning a Seated Virtual Avatar in Virtual Space—Smartphone Referring now specifically to FIG. 3, in one exemplary embodiment, the app of the present disclosure is used to break out from a current user flow on a web app or the like to an immersive AR/VR experience while seated, such as in a vehicle or the like. The user 10 is asked to follow a series of instructions while limiting extraneous motion to ensure accurate results. Specifically, the user 10 is asked to move the camera on his or her smartphone 12 around to obtain information about his or her real world surroundings. First, the user 10 is asked to place his or her smartphone 12 on the edge of the seating surface 40 being utilized, with the camera having an unobstructed view of the ground, such that the app can measure the distance from the camera and seating surface 40 to the ground, also providing the length of the lower leg of the user 10. The user 10 is asked to take action by clicking a button to start recording the associated transform information, with the camera enabling a spatial understanding of the real object(s) in the physical space transposed to the virtual space.

Figure 4:
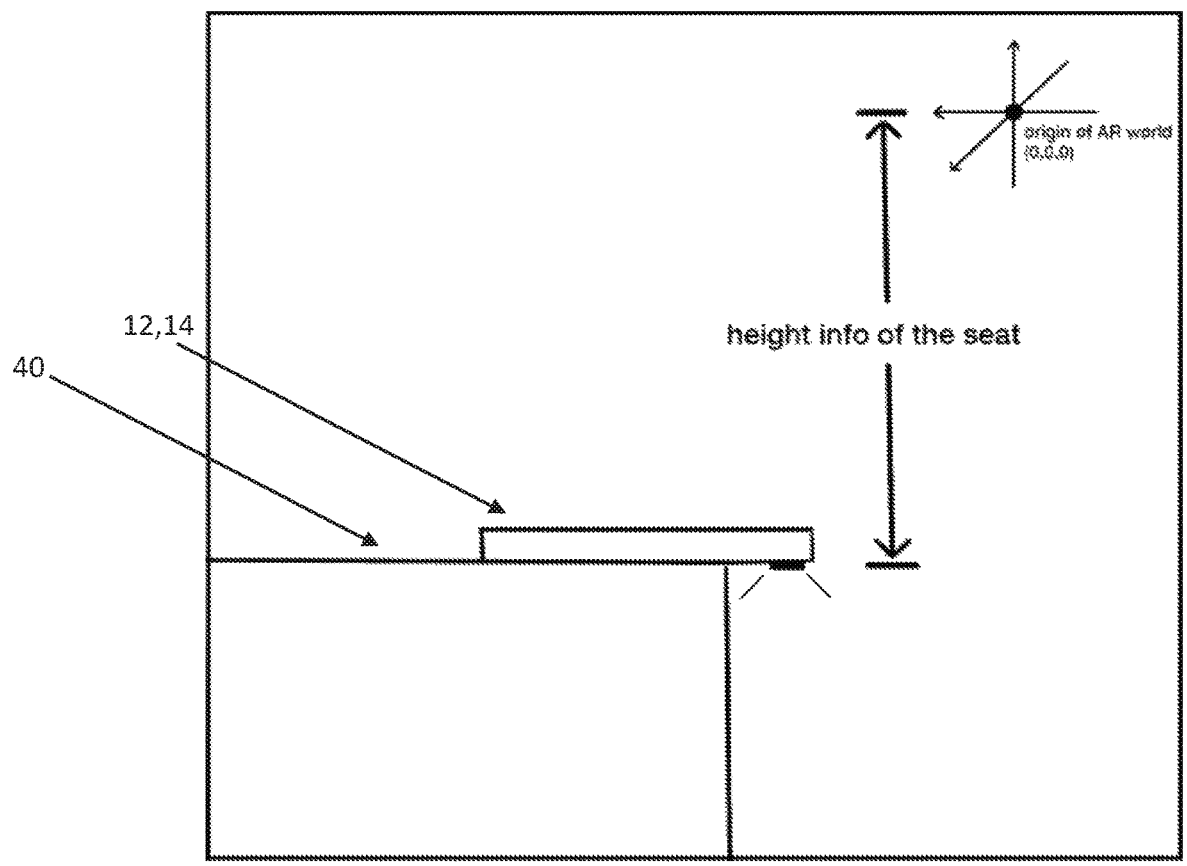
FIG. 4 is a schematic diagram illustrating the operation of another exemplary step of the AR/VR app of the present disclosure, highlighting the use of a smartphone or a 6DoF controller to orient a seated real world user in virtual space.

This is further illustrated in FIG. 4. The above measurement provides the distance from and relative position of the seating surface 40 with respect to the origin of the AR world, as provided by the app. Here, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step.

Figure 5:
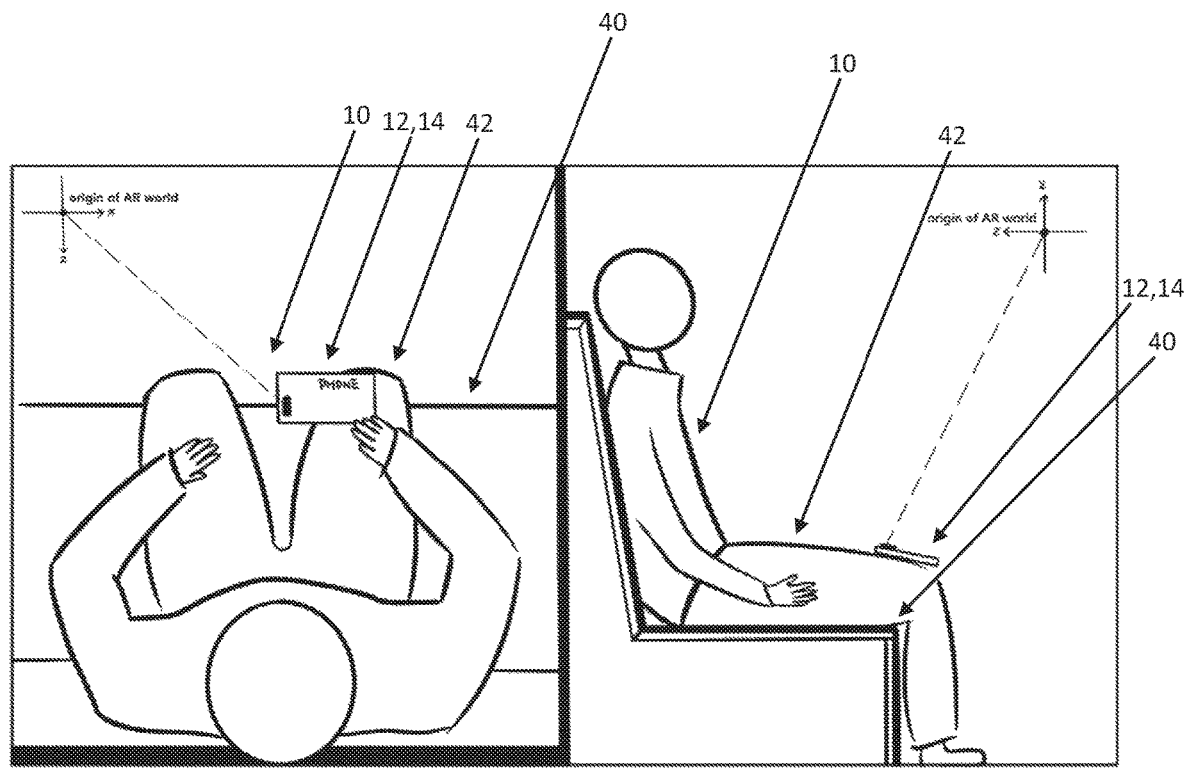
FIG. 5 is a schematic diagram illustrating the operation of a further exemplary step of the AR/VR app of the present disclosure, highlighting the use of a smartphone or a 6DoF controller to orient a seated real world user in virtual space.

Referring now specifically to FIG. 5, the user 10 is then prompted to place the smartphone 12 on the top-center portion of his or her legs 42 near the edge of the seating surface 40. The user 10 should be seated in an upright position, and the camera of the smartphone 12 should be leveled and have visibility to the ground near the edge of the seating surface 40. This allows the distance from the top of the legs 42 to the ground to be measured, and the center of the legs 42 to be identified, again with reference to the origin of the AR world. Optionally, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step.

Figure 6:
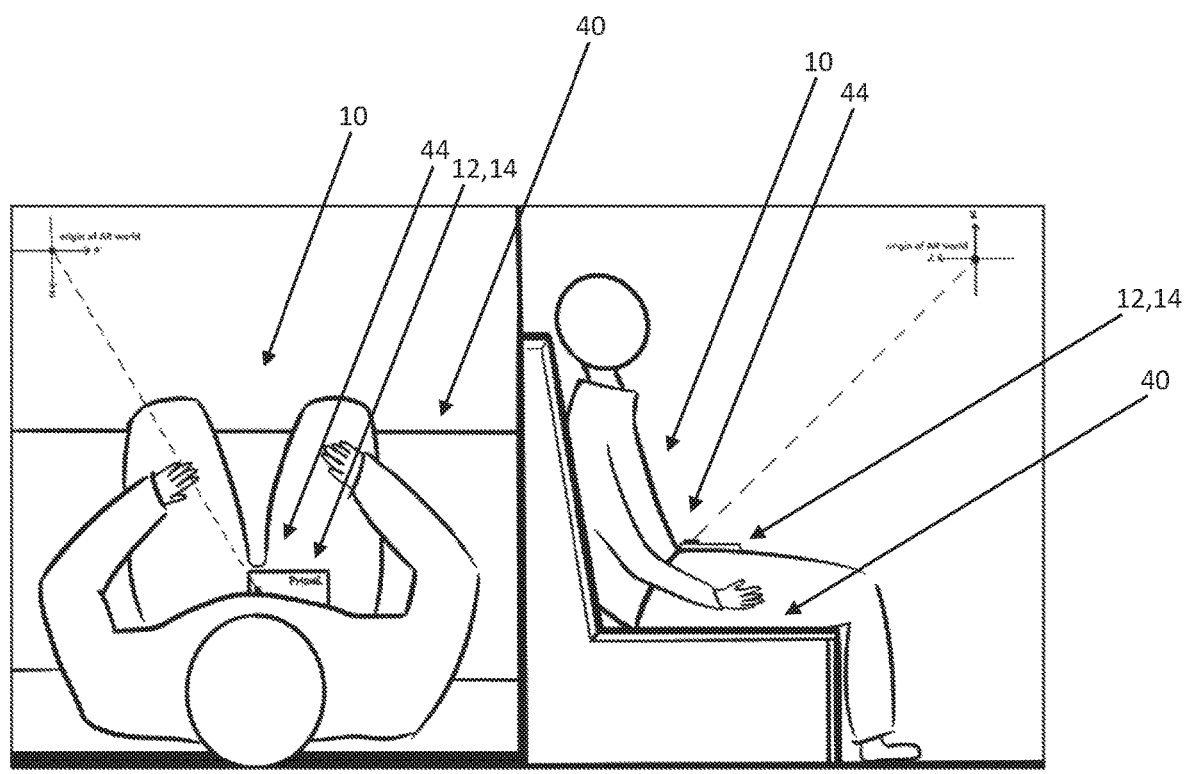
FIG. 6 is a schematic diagram illustrating the operation of a still further exemplary step of the AR/VR app of the present disclosure, highlighting the use of a smartphone or a 6DoF controller to orient a seated real world user in virtual space.

Referring now specifically to FIG. 6, the user 10 is then prompted to place the smartphone 12 on the top portion of his or her hips 44. The user 10 should again be seated in an upright position, and the camera of the smartphone 12 should be leveled. This allows the relative position of the hips 44 to be measured, again with reference to the origin of the AR world. Optionally, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step.

Figure 7:
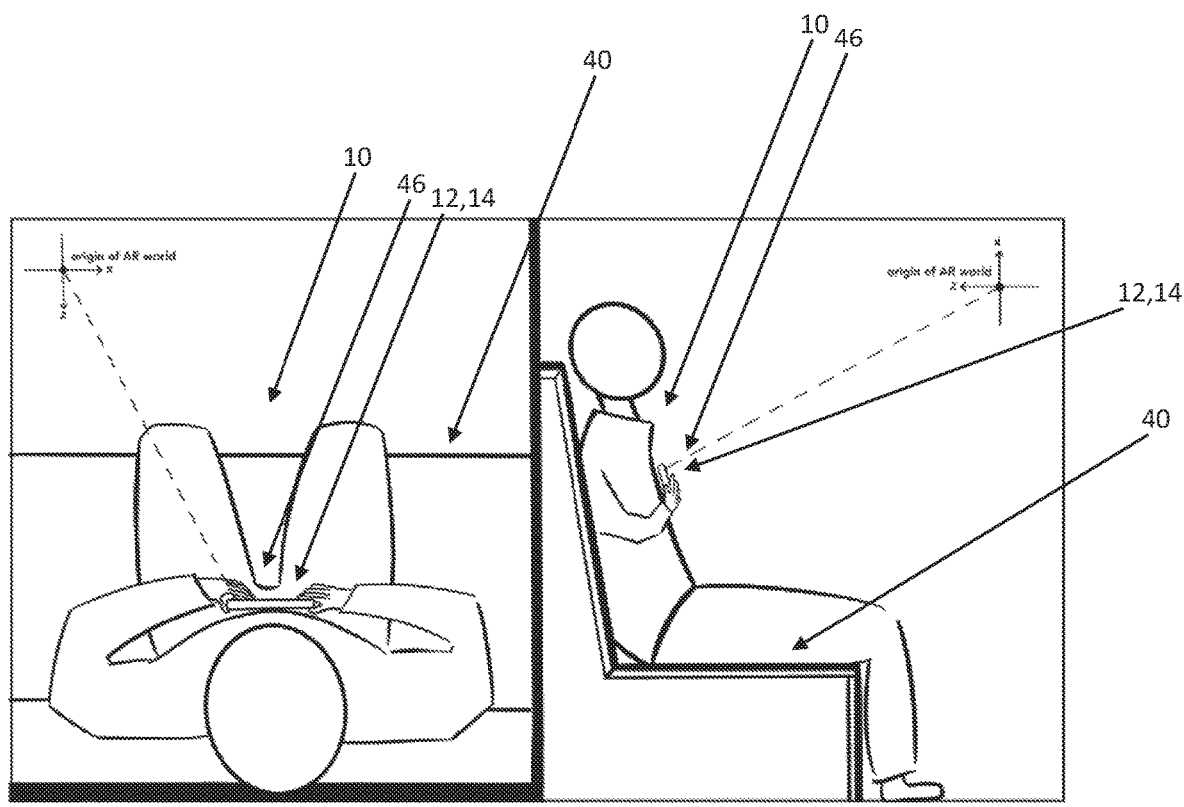
FIG. 7 is a schematic diagram illustrating the operation of a still further exemplary step of the AR/VR app of the present disclosure, highlighting the use of a smartphone or a 6DoF controller to orient a seated real world user in virtual space.

Referring now specifically to FIG. 7, the user 10 is then prompted to place the smartphone 12 on his or her chest 46. The user 10 should again be seated in an upright position, and the camera of the smartphone 12 should be leveled. This allows the relative position of the hips 46 to be measured, again with reference to the origin of the AR world. Optionally, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step.

Other points can similarly be identified, located, and measured. It should be noted that, although a smartphone implementation is presented, a similar methodology can be carried out with a 6DoF controller or the like, provided that a frame or reference in both the real world and the AR world is available.

Figure 8:
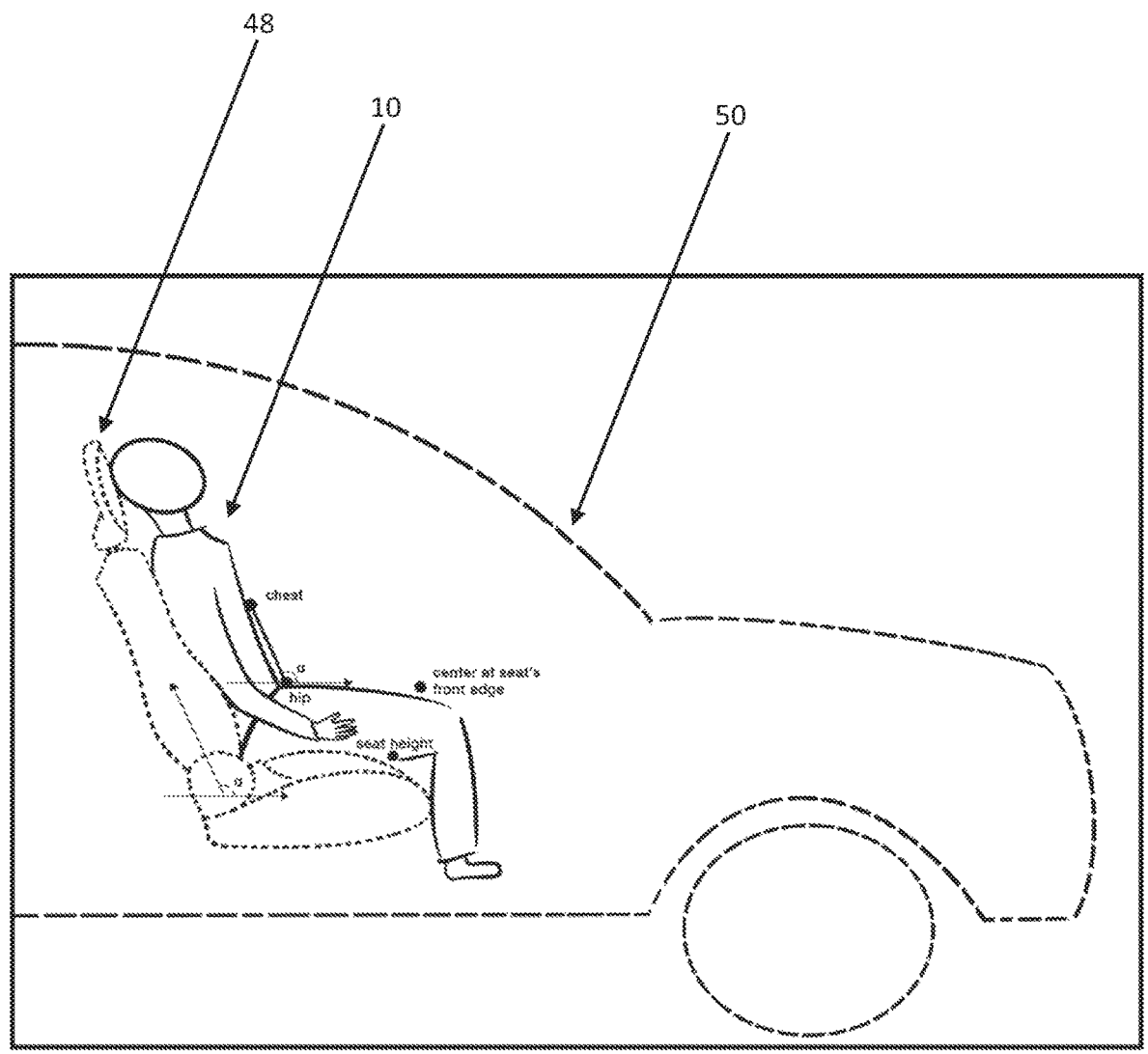
FIG. 8 is a schematic diagram illustrating the operation of a still further exemplary step of the AR/VR app of the present disclosure, highlighting the use of a smartphone or a 6DoF controller to orient a seated real world user in virtual space.

Referring to FIG. 8, based on all of the data captured, the position and direction of the user 10 and the seat 48 within the vehicle 50 can be determined from the seat height and the center position of the front edge of the seat 48, in the AR world as translated from the real world. The rotation angle (a) of the backrest of the seat 48 and the user 10 can also be determined. Again, additional measurements can be used to determine additional parameters as well. From his information, an avatar of the user 10 can be spawned in the AR world and/or an immersive environment can be spawned around the user 10 with the proper orientation and relationship to the user 10 or the user's avatar. For example, a configurable vehicle seat can be spawned based on a current user pose, with the backrest bent to an appropriate degree, etc.

Example 2: Aligning a Seated Real World User or Spawning a Seated Virtual Avatar in Virtual Space—6DoF Controller Referring again specifically to FIG. 3, in another exemplary embodiment, the app of the present disclosure is used to break out from a current user flow on a web app or the like to an immersive AR/VR experience while seated, such as in a vehicle or the like. The user 10 is asked to follow a series of instructions while limiting extraneous motion to ensure accurate results. Specifically, the user 10 is asked to move his or her 6DoF controller 14 (associated with a VR headset or the like) around to obtain information about his or her real world surroundings. First, the user 10 is asked to place his or her 6DoF controller 14 on the edge of the seating surface 40 being utilized, such that the app can measure the distance from the 6DoF controller 14 and seating surface 40 to the ground, also providing the length of the lower leg of the user 10. The user 10 is asked to take action by actuating a trigger to start recording the associated transform information, with the 6DoF controller 14 enabling a spatial understanding of the real object(s) in the physical space transposed to the virtual space.

This is further illustrated in FIG. 4. The above measurement provides the distance from and relative position of the seating surface 40 with respect to the origin of the AR world, as provided by the app. Here, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step.

Referring now specifically to FIG. 5, the user 10 is then prompted to place the 6DoF controller 14 on the top-center portion of his or her legs 42 near the edge of the seating surface 40. The user 10 should be seated in an upright position, and the 6DoF controller 14 should be leveled. This allows the distance from the top of the legs 42 to the ground to be measured, and the center of the legs 42 to be identified, again with reference to the origin of the AR world. Optionally, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step.

Referring now specifically to FIG. 6, the user 10 is then prompted to place the 6DoF controller 14 on the top portion of his or her hips 44. The user 10 should again be seated in an upright position, and the 6DoF controller 14 should be leveled. This allows the relative position of the hips 44 to be measured, again with reference to the origin of the AR world. Optionally, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step.

Referring now specifically to FIG. 7, the user 10 is then prompted to place the 6DoF controller 14 on his or her chest 46. The user 10 should again be seated in an upright position, and the 6DoF controller 14 should be leveled. This allows the relative position of the hips 46 to be measured, again with reference to the origin of the AR world. Optionally, the system collects information for a predetermined short period of time and calculates an average result from the collected data. This helps ensure greater accuracy and filters out the adverse effects of any unintended, unwanted motion. The user 10 is prompted to either redo the measurement, if required, or proceed to the next step.

Other points can similarly be identified, located, and measured. It should be noted that, although a 6DoF implementation is presented, a similar methodology can be carried out with a smartphone or the like, provided that a frame of reference in both the real world and the AR world is available.

Referring to FIG. 8, based on all of the data captured, the position and direction of the user 10 and the seat 48 within the vehicle 50 can be determined from the seat height and the center position of the front edge of the seat 48, in the AR world as translated from the real world. The rotation angle (a) of the backrest of the seat 48 and the user 10 can also be determined. Again, additional measurements can be used to determine additional parameters as well. From his information, an avatar of the user 10 can be spawned in the AR world and/or an immersive environment can be spawned around the user 10 with the proper orientation and relationship to the user 10 or the user's avatar. Alternatively, a game environment can be instantiated that fits a player's current pose and surroundings or an interactive first-person VR movie can be generated with the pose information.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to tangible media, such as data storage media, or communication media, including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus, the present disclosure utilizes existing AR/VR technologies and 3D development platforms to track transform data aligned with a real world coordinate system from an AR-enabled phone, 6DoF controller, or the like in relation to an established virtual coordinate system, thereby creating a human pose, object alignment, or like capturing tool. A user is asked to place the given device at various body joints or object part locations. The application provided then transforms this collected spatial data to reconstruct the shape of the body or alignment of the object, providing current pose or placement in the virtual world, especially at spawning. It is also contemplated to capture spatial data associated with physical objects attached to or contacting a body to improve spawning results. From there, a personalized immersive environment and experiences can be provided with proper spatial orientation relative to the person or object.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A method of recreating a real world pose or aligning a real world object in a virtual space, the method comprising:
    prompting a user to place a single device at a plurality of positions associated with a plurality of physical points associated with a body of the user, a body of another, or an object in sequence;
    capturing the plurality of positions with respect to a real world frame of reference;
    translating the plurality of positions with respect to the real world frame of reference to a frame of reference in virtual space; and
    spawning and displaying the body of the user, the body of the other, or the object with a recreation of a pose of the body of the user, a pose of the body of the other, or an alignment of the object in the virtual space using the translated plurality of positions captured using the single device.

2. The method of claim 1, further comprising:
    prompting the user to place the single device at the plurality of positions associated with the plurality of physical points associated with the body of the user, the body of the other, or the object in one or more alignments in sequence;
    capturing the plurality of positions and the one or more alignments with respect to the real world frame of reference;
    translating the plurality of positions and the one or more alignments with respect to the real world frame of reference to the frame of reference in virtual space; and
    spawning and displaying the body of the user, the body of the other, or the object with the recreation of the pose of the body of the user, the pose of the body of the other, or the alignment of the object in the virtual space using the translated plurality of positions and the one or more alignments captured using the single device.

3. The method of claim 1, wherein the device comprises one of a smartphone with a camera and a 6 degree-of-freedom controller.

4. The method of claim 3, wherein the prompting is performed by one of a mobile application executed on the smartphone and an application executed on a virtual headset.

5. The method of claim 1, wherein the capturing, translating, and recreating are performed by one or more of a mobile application executed on the smartphone, an application executed on a virtual headset, and a processor coupled to the device.

6. The method of claim 1, wherein prompting the user to successively place the device at the plurality of positions associated with the plurality of physical points associated with the body of the user, the body of another, or the object comprises prompting the user to place the device proximate one or more objects associated with the plurality of physical points associated with the body of the user, the body of another, or the object.

7. The method of claim 1, wherein capturing the plurality of positions with respect to the real world frame of reference comprises taking a plurality of position measurements over a predetermined period of time and filtering the plurality of position measurements to obtain a final position measurement.

8. The method of claim 1, wherein capturing the plurality of positions with respect to the real world frame of reference comprises taking a plurality of position measurements over a predetermined period of time and averaging the plurality of position measurements to obtain a final position measurement.

9. The method of claim 1, further comprising using the recreated pose of the body of the user, the recreated pose of the body of the other, or the recreated alignment of the object in the virtual space to instantiate other objects about the recreated pose of the body of the user, the recreated pose of the body of the other, or the recreated alignment of the object in the virtual space.

10. A non-transitory computer-readable medium stored in a memory and executed by a processor to recreate a real world pose or align a real world object in a virtual space, the non-transitory computer-readable medium executing the steps comprising:
prompting a user to place a single device at a plurality of positions associated with a plurality of physical points associated with a body of the user, a body of another, or an object in sequence;
capturing the plurality of positions with respect to a real world frame of reference;
translating the plurality of positions with respect to the real world frame of reference to a frame of reference in virtual space; and
spawning and displaying the body of the user, the body of the other, or the object with a recreation of a pose of the body of the user, a pose of the body of the other, or an alignment of the object in the virtual space using the translated plurality of positions captured using the single device.

11. The non-transitory computer-readable medium of claim 10, the steps further comprising:
prompting the user to place the single device at the plurality of positions associated with the plurality of physical points associated with the body of the user, the body of the other, or the object in one or more alignments in sequence;
capturing the plurality of positions and the one or more alignments with respect to the real world frame of reference;
translating the plurality of positions and the one or more alignments with respect to the real world frame of reference to the frame of reference in virtual space; and
spawning and displaying the body of the user, the body of the other, or the object with the recreation of the pose of the body of the user, the pose of the body of the other, or the alignment of the object in the virtual space using the translated plurality of positions and the one or more alignments captured using the single device.

12. The non-transitory computer-readable medium of claim 10, wherein the device comprises one of a smartphone with a camera and a 6 degree-of-freedom controller.

13. The non-transitory computer-readable medium of claim 12, wherein the prompting is performed by one of a mobile application executed on the smartphone and an application executed on a virtual headset.

14. The non-transitory computer-readable medium of claim 10, wherein the capturing, translating, and recreating are performed by one or more of a mobile application executed on the smartphone, an application executed on a virtual headset, and a processor coupled to the device.

15. The non-transitory computer-readable medium of claim 10, wherein prompting the user to successively place the device at the plurality of positions associated with the plurality of physical points associated with the body of the user, the body of another, or the object comprises prompting the user to place the device proximate one or more objects associated with the plurality of physical points associated with the body of the user, the body of another, or the object.

16. The non-transitory computer-readable medium of claim 10, wherein capturing the plurality of positions with respect to the real world frame of reference comprises taking a plurality of position measurements over a predetermined period of time and filtering the plurality of position measurements to obtain a final position measurement.

17. The non-transitory computer-readable medium of claim 10, wherein capturing the plurality of positions with respect to the real world frame of reference comprises taking a plurality of position measurements over a predetermined period of time and averaging the plurality of position measurements to obtain a final position measurement.

18. The non-transitory computer-readable medium of claim 10, the steps further comprising using the recreated pose of the body of the user, the recreated pose of the body of the other, or the recreated alignment of the object in the virtual space to instantiate other objects about the recreated pose of the body of the user, the recreated pose of the body of the other, or the recreated alignment of the object in the virtual space.

19. A system for recreating a real world pose or aligning a real world object in a virtual space, the system comprising:
a single device executing an application operable for prompting a user to place the device or a coupled device at a plurality of positions associated with a plurality of physical points associated with a body of the user, a body of another, or an object in sequence;
wherein the application is further operable for capturing the plurality of positions with respect to a real world frame of reference;
wherein the application is further operable for translating the plurality of positions with respect to the real world frame of reference to a frame of reference in virtual space; and
wherein the application is further operable for spawning and displaying the body of the user, the body of the other, or the object with a recreation of a pose of the body of the user, a pose of the body of the other, or an alignment of the object in the virtual space using the translated plurality of positions captured using the single device.

20. The system of claim 19, wherein the application is further operable for:
prompting the user to place the single device at the plurality of positions associated with the plurality of physical points associated with the body of the user, the body of the other, or the object in one or more alignments in sequence;
capturing the plurality of positions and the one or more alignments with respect to the real world frame of reference;
translating the plurality of positions and the one or more alignments with respect to the real world frame of reference to the frame of reference in virtual space; and
spawning and displaying the body of the user, the body of the other, or the object with the recreation of the pose of the body of the user, the pose of the body of the other, or the alignment of the object in the virtual space using the translated plurality of positions and the one or more alignments captured using the single device.

* * * * *